(12) United States Patent
Park

(10) Patent No.: US 10,656,425 B1
(45) Date of Patent: May 19, 2020

(54) VIRTUAL REALITY EXPERIENCE DEVICE

(71) Applicant: DATAKING. INC, Seoul (KR)

(72) Inventor: Sun Kyou Park, Seoul (KR)

(73) Assignee: DATAKING. INC, Seoul (KR)

( * ) Notice: Subject to any disclaimer, the term of this patent is extended or adjusted under 35 U.S.C. 154(b) by 0 days.

(21) Appl. No.: 16/203,064

(22) Filed: Nov. 28, 2018

(30) Foreign Application Priority Data

Nov. 12, 2018 (KR) .................. 10-2018-0137797

(51) Int. Cl.
*G02B 27/01* (2006.01)
(52) U.S. Cl.
CPC .. *G02B 27/0176* (2013.01); *G02B 2027/0154* (2013.01); *G02B 2027/0169* (2013.01)
(58) Field of Classification Search
CPC ........ G02B 27/0176; G02B 2027/0154; G02B 2027/0169
See application file for complete search history.

(56) References Cited

U.S. PATENT DOCUMENTS

| | | | | |
|---|---|---|---|---|
| 9,056,240 B2* | 6/2015 | Carrell | .................. | A63C 17/061 |
| 10,275,019 B1* | 4/2019 | Tett | ....................... | G06F 3/0338 |
| 2006/0139317 A1* | 6/2006 | Leu | ........................ | G06F 3/011 |
| | | | | 345/156 |
| 2015/0213651 A1* | 7/2015 | Selverston | ........... | G02B 23/165 |
| | | | | 345/419 |
| 2016/0320862 A1* | 11/2016 | Schradin | ................ | A63F 13/00 |

FOREIGN PATENT DOCUMENTS

| | | |
|---|---|---|
| KR | 10-2007-0121100 A | 12/2007 |
| KR | 10-1693082 B1 | 1/2017 |
| KR | 10-2017-0053384 A | 5/2017 |
| KR | 10-2018-0112270 A | 10/2018 |
| WO | 98/37538 A1 | 8/1998 |
| WO | 2006/120489 A1 | 11/2006 |

OTHER PUBLICATIONS

International Search Report issued in PCT/KR2018/014336; dated Aug. 12, 2019.

* cited by examiner

*Primary Examiner* — Afroza Chowdhury
(74) *Attorney, Agent, or Firm* — Studebaker & Brackett PC

(57) ABSTRACT

The inventive concept relates to a virtual reality experience device that enables a user to stably have a display module on according to the user's physical condition and accurately matches a viewpoint change intended by the user and a virtual reality viewpoint change, thereby realistically guiding exhibitions, performances, expositions, perspectives, and the like.

8 Claims, 5 Drawing Sheets

(1)    (2)

VIRTUAL REALITY EXPERIENCE DEVICE

CROSS-REFERENCE TO RELATED APPLICATIONS

A claim for priority under 35 U.S.C. § 119 is made to Korean Patent Application No. 10-2018-0137797 filed on Nov. 12, 2018 in the Korean Intellectual Property Office, the entire contents of which are hereby incorporated by reference.

BACKGROUND

Embodiments of the inventive concept described herein relate to a virtual reality experience device installed in various event venues to enable a user to stably have a display module on according to the user's physical condition and change a virtual reality viewpoint as intended, thereby realistically guiding exhibitions, performances, expositions, perspectives, and the like.

Virtual reality (VR), which is also referred to as artificial reality (AR), cyberspace, or virtual worlds, implies that a user has a real experience in a computer-generated virtual world.

In recent years, virtual reality has been used in various fields due to an advantage of transcending time and space. In particular, virtual reality experience devices have been increasingly installed in various event venues (e.g., an exhibition hall, a theatre, an exposition, and an observatory) to guide, in advance, contents to be watched.

In general, a virtual reality experience device allows a user to have a head mounted display (HMD) on and watch virtual reality, with the user's field of view blocked from the real world.

However, the conventional virtual reality experience device has a problem in that, since the head mounted display is provided without a support member, the head mounted display is not stably worn by the user and is likely to be robbed or lost although it has a high degree of freedom.

Furthermore, the conventional virtual reality experience device has a problem in that a virtual reality viewpoint is unintentionally changed due to the high degree of freedom.

SUMMARY

Embodiments of the inventive concept provide a virtual reality experience device that enables a user to stably have a display module on according to the user's physical condition and accurately matches a viewpoint change intended by the user and a virtual reality viewpoint change, thereby realistically guiding exhibitions, performances, expositions, perspectives, and the like.

The problems to be solved by the inventive concept are not limited to the aforementioned problems, and any other problems not mentioned herein will be clearly understood from the following description by those skilled in the art to which the inventive concept pertains.

According to an aspect of an embodiment, a virtual reality experience device includes a base, a frame supported on the base and extending with respect to a z-axis, and a display module disposed in the frame to play back a virtual reality video. The base includes a main body fixed to the ground and a treadmill disposed on the base so as to be rotatable about the z-axis. The frame and the display module operate in conjunction with rotation of the treadmill about the z-axis, and a viewpoint of the virtual reality video is changed in synchronization with rotation of the display module about the z-axis.

The treadmill may include a support part that supports the frame and a plurality of rollers disposed in the support part to make contact with the main body and spaced apart from each other in a circumferential direction with respect to the z-axis.

The plurality of rollers may have a fixed axis of rotation in a radial direction with respect to the z-axis.

The frame may include a shaft passing through the treadmill with respect to the z-axis and a thrust bearing disposed between the shaft and the main body to support the shaft with respect to the z-axis.

The treadmill may have a guide hole or a guide groove formed in an outer circumferential surface thereof in a circumferential direction with respect to the z-axis, and the main body may have a stopper received in the guide hole or the guide groove. The guide hole or the guide groove may have a rotation angle of less than 360 degrees, and a radius of rotation of the treadmill may be determined based on the rotation angle of the guide hole or the guide groove.

The frame may have an empty space formed therein, and the display module may include a player disposed inside the frame to play back the virtual reality video, a first lever disposed outside the frame, and a second lever disposed outside the frame and located on an opposite side to the first lever.

A user on the main body may bring a face of the user into close contact with the player and may hold the first lever and the second lever to rotate the treadmill about the z-axis.

The display module may be disposed in the frame so as to be movable along the z-axis and rotatable about an x-axis. The viewpoint of the virtual reality video may be independent of movement of the display module along the z-axis and may be changed in synchronization with rotation of the display module about the x-axis.

The virtual reality experience device may further include an operating module disposed on at least one of the frame and the base and provided for user operation.

The operating module may provide, to a user, an interface for selecting at least one of on/off of the virtual reality experience device, a real-world space experienced through virtual reality, and a playback viewpoint of the virtual reality video.

The other detailed items of the inventive concept are described and illustrated in the specification and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
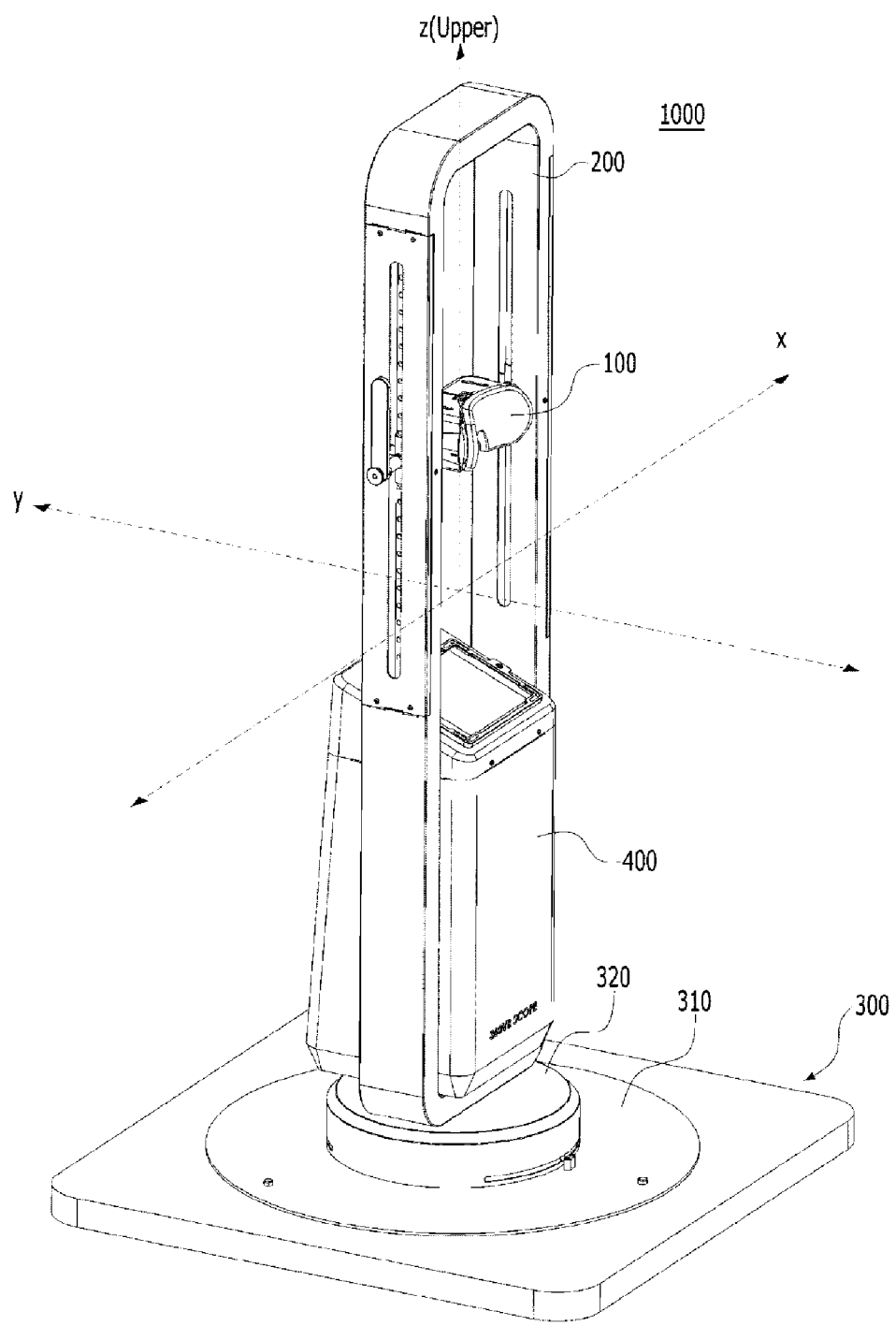
FIG. 1 is a perspective view illustrating a virtual reality experience device of the inventive concept.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

Hereinafter, x-, y-, and z-axes are axes based on a real-world three-dimensional rectangular coordinate system and may be defined as x-, y-, and z-axes illustrated in the drawings. The z-axis may be oriented in the vertical direction. Therefore, one side of the z-axis may be defined as an upper side, and the other side of the z-axis may be defined as a lower side.

Figure 2:
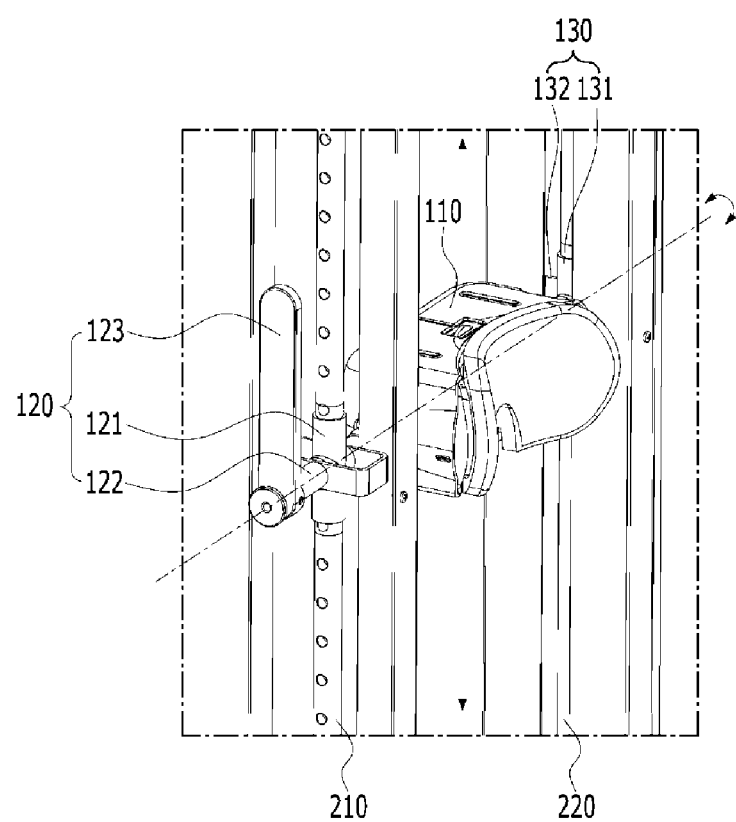
FIG. 2 is a perspective view illustrating a display module moving along a z-axis in the virtual reality experience device of the inventive concept.
Figure 3:
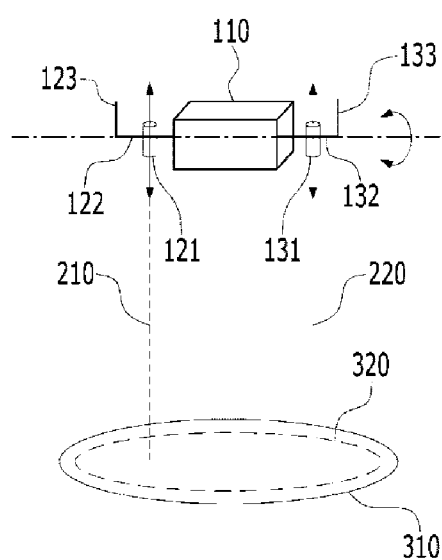
FIG. 3 is a conceptual diagram illustrating the display module that moves along the z-axis and rotates about an x-axis and the z-axis in the virtual reality experience device of the inventive concept.
Figure 3:
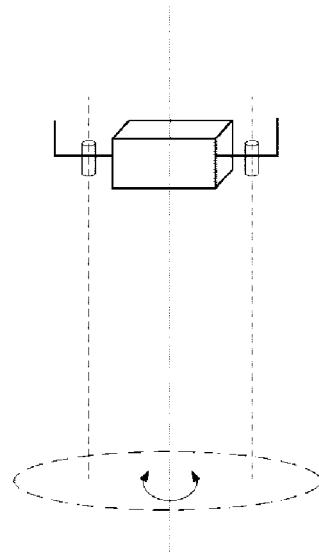
Figure 4:
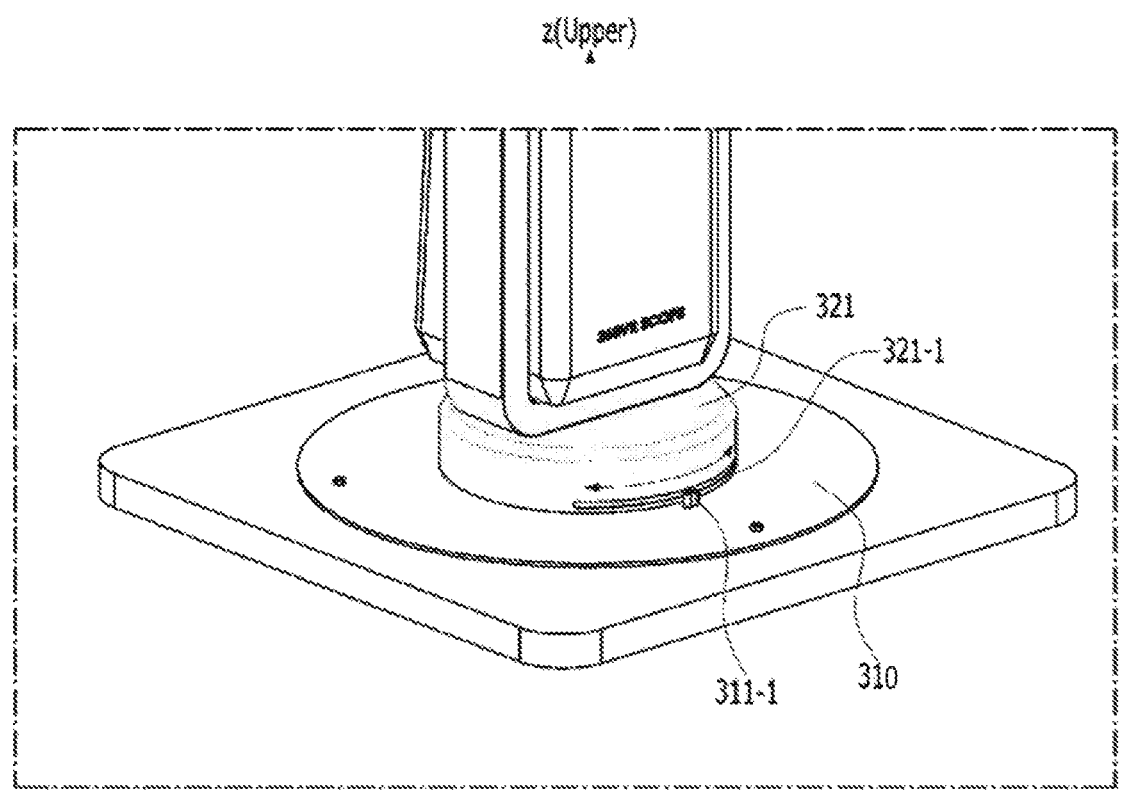
FIG. 4 is a partial perspective view illustrating a lower portion of the virtual reality experience device of the inventive concept.

Hereinafter, a virtual reality experience device 1000 of the inventive concept will be described with reference to the accompanying drawings. FIG. 1 is a perspective view illustrating the virtual reality experience device of the inventive concept. FIG. 2 is a perspective view illustrating a display module moving along a z-axis in the virtual reality experience device of the inventive concept. FIG. 3 is a conceptual diagram illustrating the display module that moves along the z-axis and rotates about an x-axis and the z-axis in the virtual reality experience device of the inventive concept. FIG. 4 is a partial perspective view illustrating a lower portion of the virtual reality experience device of the inventive concept.

Figure 5:
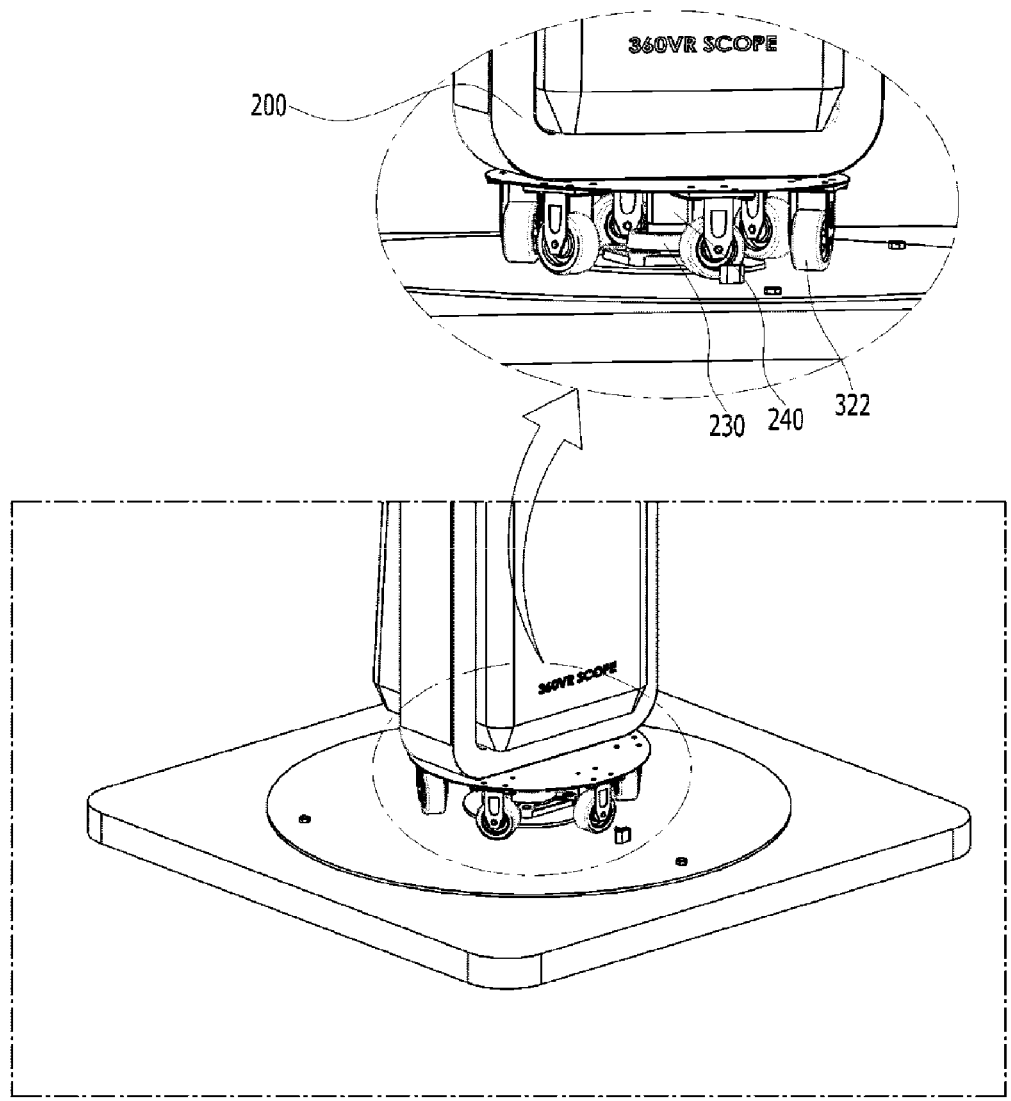
FIG. 5 is an exploded perspective view illustrating the lower portion of the virtual reality experience device of the inventive concept.

FIG. 5 is an exploded perspective view illustrating the lower portion of the virtual reality experience device of the inventive concept.

The virtual reality experience device 1000 of the inventive concept may be installed in an exhibition hall, a theatre, and an observatory to guide an event venue, a perspective, and the like (contents to be watched) in advance through virtual reality (VR). However, the use and function of the virtual reality experience device 1000 of the inventive concept are not limited thereto, and the virtual reality experience device 1000 may have other uses and functions within a range in which those skilled in the art can make an application. For example, the virtual reality experience device 1000 of the inventive concept may be applied to various types of game machines that a user plays in virtual reality.

The virtual reality experience device 1000 of the inventive concept is characterized in that a display module 100 is stably supported by a frame 200 and moves upward or downward along the z-axis to match the user's physical condition (e.g., height) and the user wears the display module 100 on the face of the user and rotates the display module 100 about the x-axis and the z-axis (Roll control and Yaw control) to change a virtual reality viewpoint.

Accordingly, the display module 100, which is supported by the frame 200, may be stably worn on the user's face to match the user's height, and the user may be provided with a virtual reality video as intended to have a realistic experience.

To this end, the virtual reality experience device 1000 of the inventive concept may include the display module 100, the frame 200, a base 300, and an operating module 400.

The display module 100 may be a medium that provides the virtual reality video to the user. The display module 100 may be provided in a head mounted display (HMD) form. Accordingly, the display module 100 may be worn on the user's face, and the user's field of view may be blocked from the real world.

The display module 100 may be disposed in the frame 200 so as to be movable along the z-axis. This is intended to enable the user to stably have the display module 100 on by allowing the display module 100 to be supported by the frame 200 and change the z-axis phase (the vertical phase) of the display module 100 according to the user's physical condition (e.g., height).

Accordingly, the viewpoint of the virtual reality video may be independent of movement of the display module 100 along the z-axis. For example, in the case where the display module 100 moves along the z-axis, the viewpoint of the virtual reality video is fixed without change (because the user does not intend to change the viewpoint of the virtual reality video).

The display module 100 may rotate about the x-axis (Roll control) and the z-axis (Yaw control). The former may be implemented by disposing the display module 100 in the frame 200 such that the display module 100 is rotatable about the x-axis, and the latter may be implemented by disposing the frame 200 on the base 300 such that the frame 200 is rotatable about the z-axis.

The radius of rotation of the display module 100 about the x-axis may be limited according to the user's ergonomic operating range, and the radius of rotation of the display module 100 about the z-axis may be limited by a stopper 311-1 and a guide hole or groove 321-1 that will be described below.

That is, the display module 100 may not rotate about the x-axis and the z-axis through an angle of 360 degrees, and the radius of rotation of the display module 100 may be ergonomically and mechanically limited.

The frame 200 may extend with respect to the z-axis and may have a rectangular shape that has an empty space therein and rounded corners. However, the shape of the frame 200 of the inventive concept is not limited thereto, and the frame 200 may have various shapes within a range in which those skilled in the art can make a change by applying ordinary skill.

The frame 200 may be a member that stably supports the display module 100. At the same time, the frame 200 may be stably supported by the base 300. The operating module 400 may be disposed in the frame 200 so as to be spaced apart downward from the display module 100.

The display module 100 and the operating module 400 may be disposed inside the frame 200 (in the empty space of the frame 200). In this case, as will be described below, a first lever 123 and a second lever 133 of the display module 100 may be disposed on the exterior of the frame 200 to enable the user to easily rotate the display module 100 about the x-axis and the z-axis with the hands.

The frame 200 may be disposed on the base 300 so as to be rotatable about the z-axis. When the frame 200 rotates about the z-axis, the display module 100 may rotate together about the z-axis (Yaw control).

The base 300 may be a member where the user sits. The base 300 may be a member that supports the frame 200.

The base 300 may be provided in various forms according to the user's posture. For example, the base 300 may be provided in a plate form (platform) in the case where the user uses the virtual reality experience device 100 in an upright position and may be provided in a chair form in the case where the user uses the virtual reality experience device 100 in a sitting position. However, the base 300 is not limited thereto.

The base 300 may be provided in various forms to allow the frame 200 to rotate about the z-axis. For example, the base 300 may include, but is not limited to, a fixed main body (a stator) 310 and a treadmill (a rotor) 320 disposed on the main body 310 so as to be rotatable (about the z-axis) and configured to support the frame 200.

The operating module 400 may be disposed on at least one of the frame 200 and the base 300. The operating module 400 may be spaced apart downward from the display module 100. The operating module 400 may be provided for the user's operation. For example, the operating module 400 may be, but is not limited to, a smart pad or a touch screen type kiosk.

The operating module 400 may provide various pieces of information about the virtual reality experience device 1000 to the user. Furthermore, the operating module 400 may provide, to the user, an interface for selecting at least one of on/off of the virtual reality experience device 1000, a real-world space experienced through virtual reality, and a playback viewpoint of the virtual reality video.

The operating module 400 may wiredly/wirelessly communicate with the display module 100 and may transfer the user's operating command to the display module 100. That is, the user may experience user-selected contents as a virtual reality video through the display module 100.

For example, the user may touch a smart pad to select a contents menu, the operating module 400 may transmit the user's operating command to the display module 100 through Wi-Fi communication, and the display module 100 may play back a video of contents selected by the user. Accordingly, the user may experience a virtual reality video selected by the user.

Hereinafter, a configuration for moving the display module 100 along the z-axis and rotating the display module 100 about the x-axis and the z-axis in the virtual reality experience device 100 of the inventive concept will be described in more detail.

To this end, the display module 100 may include a player 110 (a part through which the virtual reality video is provided), a first connector 120, a second connector 130, the first lever 123, and the second lever 133, the frame 200 may include a first rail 210, a second rail 220, a thrust bearing 230, and a shaft 240, and the base 300 may include the main body 310 and the treadmill 320.

The first rail 210 and the second rail 220, paired with each other, may be embedded in an exterior member of the frame 200. The first rail 210 and the second rail 220 may have symmetric arrangement and shape in which the first and second rails 210 and 220 are spaced apart from each other along the x-axis and extend along the z-axis. The first rail 210 and the second rail 220 may guide movement of the display module 100 along the z-axis.

The first connector 120 may be provided on a left end portion of the player 110 and may be connected to the first rail 210, and the second connector 130 may be provided on a right end portion of the player 110 and may be connected to the second rail 220. The first connector 120 and the second connector 130 may also have symmetric arrangement and shape.

The first connector 120 may include connector 1-1 121 disposed on the first rail 210 and guided by the first rail 210 and connector 1-2 122 coupled to connector 1-1 121 so as to be rotatable (about the x-axis) and connected to the left side of the player 110. The second connector 130 may include connector 2-1 131 disposed on the second rail 220 and guided by the second rail 220 and connector 2-2 132 coupled to connector 2-1 131 so as to be rotatable (about the x-axis) and connected to the right side of the player 110.

That is, the player 110 may move along the z-axis as connector 1-1 121 and connector 2-1 131 are guided along the z-axis by the first rail 210 and the second rail 220. Furthermore, the player 110 may be rotated about the x-axis by connector 1-2 122 and connector 2-2 132 that are not structurally connected to the first rail 210 and the second rail 220. Accordingly, the player 110 may be moved along the z-axis and rotated about the x-axis by the first connector 120 and the second connector 130 (see (1) of FIG. 3; independent operation is also possible).

The display module 100 is moved along the z-axis to match the user's physical condition, and the viewpoint of the virtual reality video is not changed by the movement of the display module 100 along the z-axis (the viewpoint is fixed).

Though unlikely, the rotation of the display module 100 about the x-axis is intended for the user to change the viewpoint of the virtual reality video. Accordingly, in the case where the display module 100 rotates about the x-axis, the viewpoint of the virtual reality video may be changed in synchronization with the rotation of the display module 100 about the x-axis (e.g., the frame of the virtual reality video may move in the opposite direction to the direction of rotation in the real world with respect to the x-axis of a coordinate system in virtual reality, but is not limited thereto).

The first lever 123 and the second lever 133 may be provided to enable the user to easily rotate the display module 100 about the x-axis. The first lever 123 may be disposed on connector 1-2 122, and the second lever 133 may be disposed on connector 2-2 132. Accordingly, the user may pull or push the first lever 123 and the second lever 133 with respect to the x-axis to rotate the display module 100 about the x-axis.

In this case, for user convenience, the player 110 may be disposed inside the frame 200 having the empty space therein, the first lever 123 may be disposed outside the frame 200 having the empty space therein, and the second lever 133 may be disposed outside the frame 200 and may be located on the opposite side to the first lever 123. Furthermore, the first lever 123 and the second lever 133 may have symmetric arrangement and shape (e.g., symmetric arrangement with respect to the z-axis).

For example, the first lever 123 and the second lever 133 may be disposed on the left and right sides of the frame 200, respectively. That is, the first lever 123 may be located on the opposite side to the player 110 with respect to the first rail 210, and the second lever 133 may be located on the opposite side to the player 110 with respect to the second rail 220.

The radius of rotation of the display module 100 about the x-axis may be limited according to the user's ergonomic operating range. For example, the radius of rotation of the display module 100 about the x-axis may be determined according to the tilting range of the user's neck.

The display module 100 and the frame 200 may rotate about the z-axis in conjunction with rotation of the treadmill 320 of the base 300 about the z-axis.

To this end, the main body 310 may be fixed to the ground (stator), and the treadmill 320 may be disposed on the main body 310 so as to be rotatable (rotor). In this case, the "ground" may be a substantially horizontal plane that supports the virtual reality experience device 1000 of the inventive concept. However, the ground may be obliquely formed.

The frame 200 may be supported by the treadmill 320 and may operate in conjunction with rotation of the treadmill 320 about the z-axis, and the display module 100 may be supported by the frame 200 and may operate in conjunction with the rotation of the treadmill 320 about the z-axis.

The user on the main body 310 may hold the first lever 123 and the second lever 133 and may rotate the treadmill 320 about the z-axis. That is, the user exerting the weight on the main body 310 may pull or push the first lever 123 and the second lever 133 with respect to the z-axis to rotate the display module 100 about the z-axis.

The frame 200 and the treadmill 320 may have various forms to stably support the user and easily implement rotation about the z-axis according to the user's intention.

For example, the frame 200 may include the thrust bearing 230 and the shaft 240 that passes through a support part 321 of the treadmill 320 with respect to the z-axis and is supported by the thrust bearing 230.

That is, the bottom of the frame 200 may be supported by the support part 321, and the shaft 240, by which the frame 200 is rotated about the z-axis, may pass through the support part 321 at the bottom of the frame 200 and may be supported by the thrust bearing 230 in the z-axis direction (that is, the bearing being a "vertical" thrust bearing). Accordingly, the frame 200 may be disposed on the support part 321 so as to be rotatable about the z-axis while being stably supported by the support part 321.

The treadmill 320 may include the support part 321 that supports the frame 200 and forms the upper surface of the treadmill 320 and a plurality of rollers 322 disposed in the support part 321 to make contact with the main body 310.

The plurality of rollers 322 may be spaced apart from each other in the circumferential direction with respect to the z-axis. Accordingly, the support part 321 may be stably supported by the plurality of rollers 322 without being tilted. In addition, the plurality of rollers 322 may have a fixed axis of rotation in the radial direction with respect to the z-axis to guide the rotation of the support part 321 about the z-axis while stably supporting the support part 321.

The rotation of the display module 100 about the z-axis is intended for the user to change the viewpoint of the virtual reality video. Accordingly, in the case where the display module 100 rotates about the z-axis, the viewpoint of the virtual reality video may be changed in synchronization with the rotation of the display module 100 about the z-axis (e.g., the frame of the virtual reality video may move in the opposite direction to the direction of rotation in the real world with respect to the z-axis of the coordinate system in virtual reality, but is not limited thereto).

The radius of rotation of the display module 100 about the z-axis may be determined by the stopper 311-1 and the guide hole or groove 321-1. To this end, the guide hole or groove 321-1 may be formed in the outer circumferential surface of the treadmill 320 in the circumferential direction with respect to the z-axis. The guide hole or groove 321-1 may be formed to have a rotation angle of less than 360 degrees. Furthermore, the stopper 311-1, which is received in the guide hole or groove 321-1, may protrude from the main body 310.

Accordingly, the rotation of the treadmill 320 may be stopped by the stopper 311-1 by which an end portion of the guide hole or groove 321-1 is stopped, and therefore the radius of rotation of the display module 100 about the z-axis may be determined.

The radius of rotation of the display module 100 about the z-axis may be limited to align an area where the user's viewpoint in the real world is changed and an area where a virtual reality video programmed in advance is provided.

Without being limited thereto, however, the radius of rotation of the display module 100 about the z-axis may be limited for the safety of the user.

In the case where the user rotates the display module 100 about the z-axis by twisting the user's waist while the user's face and lower body are fixed to the display module 100 and the main body 310 of the base 300, respectively, the waist may be twisted beyond an ergonomic limit by the user's mistake (e.g., slipping) to cause an accident.

However, the virtual reality experience device 1000 of the inventive concept may prevent an unexpected accident by limiting the radius of rotation of the display module 100 about the z-axis by the stopper 311-1 and the guide hole or groove 321-1.

The stopper 311-1 and the guide hole or groove 321-1 are not essential components and may be omitted according to a design request. That is, the radius of rotation of the display module 100 about the z-axis may not be limited according to the design request.

As described above, the user on the main body 310 of the base 300 may rotate the display module 100 about the z-axis by rotating the treadmill 320 about the z-axis by bringing the user's face into close contact with the player 110 of the display module 100 and holding and operating the first lever 123 and the second lever 133.

In summary, in the virtual reality experience device 1000 of the inventive concept, the display module 100 may be rotated about the x-axis and the z-axis by user operations of the levers while being stably supported by the frame 200, and the viewpoint of the virtual reality video may be changed in synchronization with the rotation of the display module 100 about the x-axis and the z-axis, whereby a viewpoint change intended by the user and a virtual reality viewpoint change may be accurately matched by the user's simple operation.

In addition, the virtual reality experience device 1000 of the inventive concept has an advantage in that, due to the rotation of the display module 100 about the x-axis and the z-axis, the user may select and experience a video for a space that is open in the vertical and horizontal directions, with a subjective intention.

The virtual reality experience device 1000 of the inventive concept may further include an electronic control module (not illustrated) for controlling the above-described components and playing back the virtual reality video. The virtual reality video played back according to control signals of the components and the driving and controlling of the components may be stored and computer-programmed in the electronic control module.

According to the disclosed embodiment, The inventive concept provides the virtual reality experience device having the display module that is supported by the frame and stably worn by the user and that moves along the z-axis to match the user's physical condition (e.g., height).

In addition, the user may easily rotate the display module about the x-axis with the levers, and the viewpoint of the virtual reality video may be changed in synchronization with the rotation of the display module about the x-axis and the z-axis, whereby a viewpoint change intended by the user and a virtual reality viewpoint change may be accurately matched.

Accordingly, the user may stably and realistically experience virtual reality using the virtual reality experience device of the inventive concept.

Effects of the inventive concept are not limited to the aforementioned effects, and any other effects not mentioned herein will be clearly understood from the following description by those skilled in the art to which the inventive concept pertains.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:
1. A virtual reality experience device comprising:
a base;
a frame supported on the base and extending with respect to a z-axis; and
a display module disposed in the frame and configured to play back a virtual reality video,
wherein the base includes a main body fixed to the ground and a treadmill disposed on the base so as to be rotatable about the z-axis, the frame and the display module operate in conjunction with rotation of the treadmill about the z-axis, and a viewpoint of the virtual reality video is changed in synchronization with rotation of the display module about the z-axis, and
wherein the treadmill has a guide hole or a guide groove formed in an outer circumferential surface thereof in a circumferential direction with respect to the z-axis, the main body has a stopper received in the guide hole or the guide groove, the guide hole or the guide groove has a rotation angle of less than 360 degrees, and a radius of rotation of the treadmill is determined based on the rotation angle of the guide hole or the guide groove.

2. The virtual reality experience device of claim 1, wherein the treadmill includes a support part configured to support the frame and a plurality of rollers disposed in the support part to make contact with the main body and spaced apart from each other in a circumferential direction with respect to the z-axis.

3. The virtual reality experience device of claim 2, wherein the plurality of rollers have a fixed axis of rotation in a radial direction with respect to the z-axis.

4. The virtual reality experience device of claim 1, wherein the frame includes a shaft passing through the treadmill with respect to the z-axis and a thrust bearing disposed between the shaft and the main body and configured to support the shaft with respect to the z-axis.

5. A virtual reality experience device comprising:
a base;
a frame supported on the base and extending with respect to a z-axis; and
a display module disposed in the frame and configured to play back a virtual reality video,
wherein the base includes a main body fixed to the ground and a treadmill disposed on the base so as to be rotatable about the z-axis, the frame and the display module operate in conjunction with rotation of the treadmill about the z-axis, and a viewpoint of the virtual reality video is changed in synchronization with rotation of the display module about the z-axis, and
wherein the frame has an empty space formed therein, and the display module includes a player disposed inside the frame and configured to play back the virtual reality video, a first lever disposed outside the frame, and a second lever disposed outside the frame and located on an opposite side to the first lever.

6. A virtual reality experience device comprising:
a base;
a frame supported on the base and extending with respect to a z-axis; and
a display module disposed in the frame and configured to play back a virtual reality video,
wherein the base includes a main body fixed to the ground and a treadmill disposed on the base so as to be rotatable about the z-axis, the frame and the display module operate in conjunction with rotation of the treadmill about the z-axis, and a viewpoint of the virtual reality video is changed in synchronization with rotation of the display module about the z-axis, and
wherein the display module is disposed in the frame so as to be movable along the z-axis and rotatable about an x-axis, and the viewpoint of the virtual reality video is independent of movement of the display module along the z-axis and is changed in synchronization with rotation of the display module about the x-axis.

7. A virtual reality experience device comprising:
a base;
a frame supported on the base and extending with respect to a z-axis;
a display module disposed in the frame and configured to play back a virtual reality video,
wherein the base includes a main body fixed to the ground and a treadmill disposed on the base so as to be rotatable about the z-axis, the frame and the display module operate in conjunction with rotation of the treadmill about the z-axis, and a viewpoint of the virtual reality video is changed in synchronization with rotation of the display module about the z-axis; and an operating module disposed on at least one of the frame and the base and provided for user operation.

8. The virtual reality experience device of claim 7, wherein the operating module provides, to a user, an interface for selecting at least one of on/off of the virtual reality experience device, a real-world space experienced through virtual reality, and a playback viewpoint of the virtual reality video.

* * * * *